Sept. 28, 1971  NOBORU TOKITA ET AL  3,608,366
TORSION PENDULUM

Filed Aug. 25, 1969  2 Sheets-Sheet 1

INVENTORS
NOBORU TOKITA et al.
BY Willard R. Sprowls

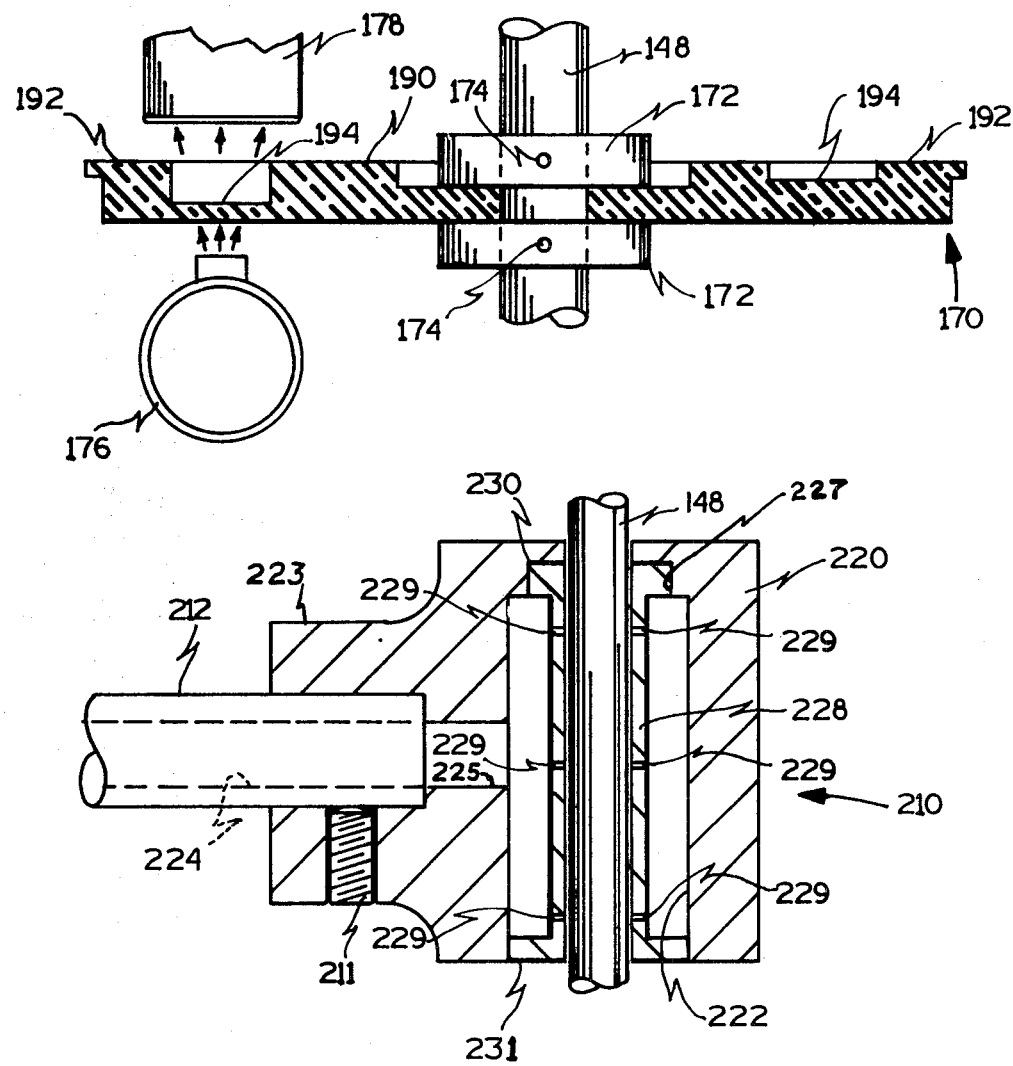

United States Patent Office 3,608,366
Patented Sept. 28, 1971

3,608,366
TORSION PENDULUM
Noboru Tokita, Wayne, and Randolph Scott, Paterson,
N.J., assignors to Uniroyal, Inc., New York, N.Y.
Filed Aug. 25, 1969, Ser. No. 852,804
Int. Cl. G01n 3/32
U.S. Cl. 73—99                                     7 Claims

ABSTRACT OF THE DISCLOSURE

Torsion pendulum test apparatus in which a sample of material under test is used as the restoring element in an angular oscillation system. In contrast to earlier devices of this type, a counterbalance weight is employed to eliminate completely all vertical forces upon the sample; an angularly oscillating optical wedge and photoelectric system is used for sensing the amplitude of oscillation, and air bearings are used for stabilization. The device gives very accurate readings for determining dynamic mechanical properties and phase transition temperatures.

FIELD OF THE INVENTION

This invention relates generally to testing apparatus, and is particularly concerned with a torsion pendulum for determining the dynamic mechanical properties and phase transition temperature of materials.

THE PRIOR ART

In the art of materials testing, it is conventional to employ a torsion pendulum in which a sample of the material under test acts as the elastic restoring element. By observing the amplitude and the rate of decay of free oscillation of such a pendulum, investigators are able to determine various dynamic mechanical properties of the test material, such as shear-storage modulus, loss modulus, absolute shear modulus, and energy dissipation factor. Furthermore, by conducting such tests over a range of temperatures, it is possible to determine various phase transition temperatures, such as glass temperature, melting temperature, and the like. The method is applicable to materials ranging from unvulcanized gum elastomers to rigid plastics.

In the past, however, the results obtained with torsion pendulums have not achieved the level of accuracy desired for the purposes of laboratory investigation. A number of technical problems are believed to limit the quality of the results obtainable with prior art devices. For example, the torsional spring characteristics of the material under test vary to a significant extent depending upon whether the sample is under tension or compression as a result of forces exerted thereon by the test apparatus.

Secondly, it is difficult, while the torsion pendulum is oscillating angularly, to prevent it from swaying horizontally, which affects the results achieved. However, any restraint which is imposed upon the pendulum to prevent it from swaying will introduce inaccuracies if it also exerts a significant frictional drag upon the angular motion.

Thirdly, for the reason just mentioned, it is necessary to detect the amplitude and rate of decay of angular oscillation of the torsion pendulum without making frictional contact therewith. Torque meters have been used in the past, but these resist the angular motion of the pendulum. The same objection applies, to a lesser degree, to inductive and electrostatic pick-up techniques. One type of system used in the past which does not brake the angular oscillation of the pendulum, involves the use of mirrors which oscillate with the pendulum to sweep a light beam through an arc. However, there are various difficulties with that type of system, since it requires a goodly number of photocells arranged in an extended array to sense the sweep of the beam, and the results are limited in resolution by the division of the beam arc into discrete photocell locations.

SUMMARY OF THE INVENTION

The present invention eliminates the sources of error which have affected the results achieved by prior art torsion pendulum devices. One feature of the invention involves the use of a flexible line passing over a rotatable pulley and supporting a counterbalancing weight which reduces to zero the vertical forces upon the material sample. Counterbalancing weights have been used in past torsion pendulums, but only for the purpose of exerting tensile force upon the sample, which limits the accuracy of the results.

According to another feature of the invention the torsion pendulum is prevented from swaying by a pair of fluid bearings which stabilize the pendulum without making solid contact therewith. The only material which impinges upon the oscillating assembly of the pendulum is a fluid stream, with the result that torsional oscillation is nearly friction-free.

Still another feature of the invention involves the use of an optical element of angularly varying transparency, in conjunction with a light source and photocell to determine the waveform of the torsional oscillation. The light source shines through the optical element toward the photocell, and the amount of light reaching the photocell varies as angular motion of the pendulum causes the optical element to vary the amount of light transmitted in a smooth and continuous manner.

The result is a torsion pendulum which exerts no tensile or compression forces upon the sample, which is stabilized against sway without incurring frictional drag, and the amplitude of which is accurately and continuously detected without affecting the motion of the pendulum.

BRIEF DESCRIPTION OF THE DRAWINGS

FIG. 2 is a fragmentary vertical section taken along the lines 2—2 of FIG. 1, and FIG. 3 is a fragmentary vertical section of one of the air bearings of the apparatus of FIG. 1.

The same reference characters refer to the same elements throughout the several view of the drawing.

DETAILED DESCRIPTION OF THE PREFERRED EMBODIMENT

Figure 1:
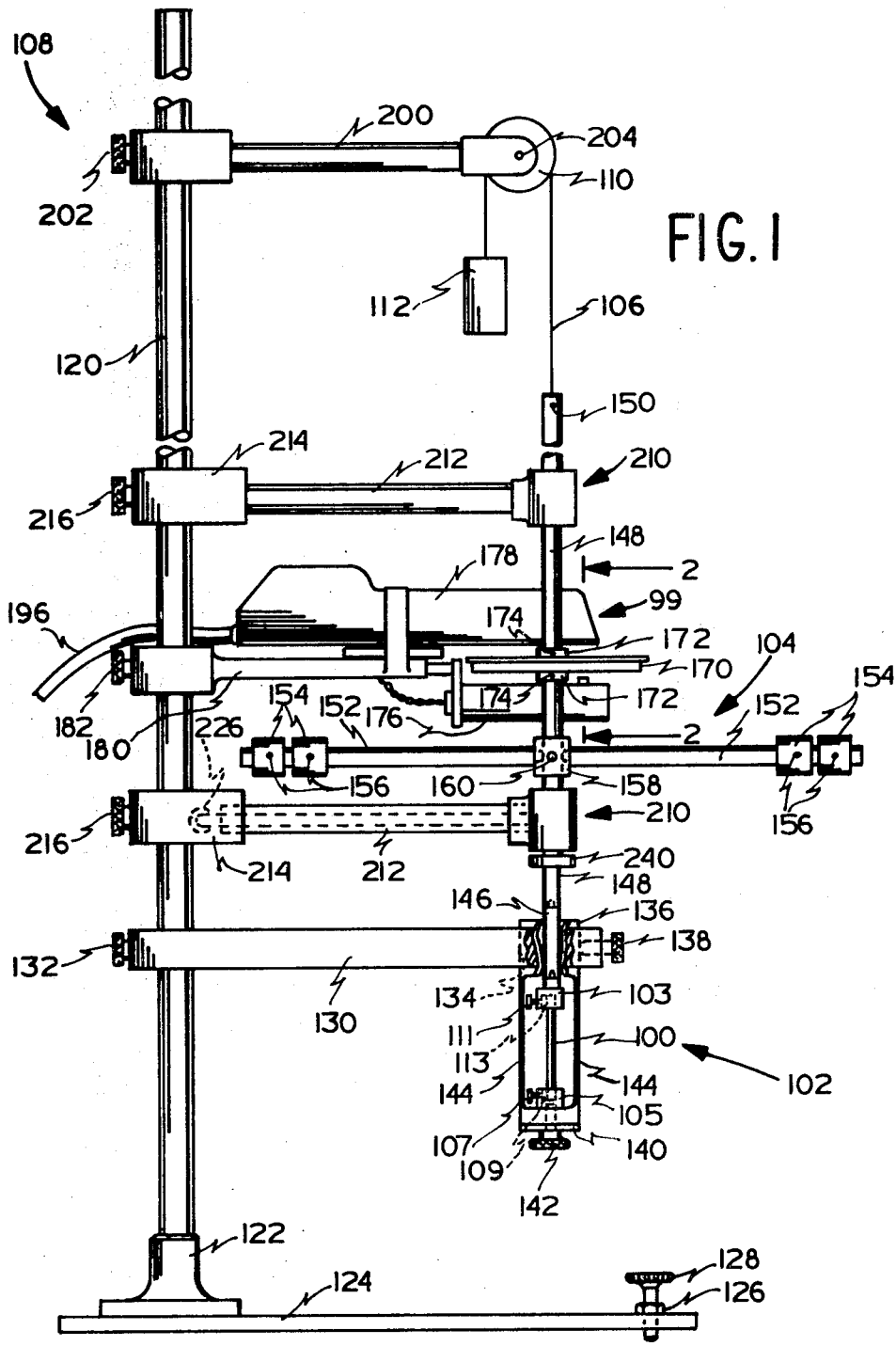
FIG. 1 is a side elevational view of torsion pendulum apparatus in accordance with the present invention, with parts broken away for clarity of illustration.

In general terms, the torsional pendulum seen in its entirety in FIG. 1 includes an oscillating assembly, generally designated 104, which is mounted for angular motion about a vertical axis. A flexible line 106 cooperates with a pulley 110 and a counterweight 112 to suspend the oscillating assembly 104 from a supporting structure 108, and the amplitude of oscillation of the assembly 104 is monitored by an optical system 99. An anchoring assembly 102 is secured to the supporting structure 108, and an elongated sample 100 of any convenient cross-sectional shape, of a material under test, is secured in an upright position with its lower end clamped or otherwise affixed to the anchoring assembly 102, and the upper end of the sample similarly affixed to the oscillating assembly 104. Thus the test sample 100 serves as the elastic restoring element, which twists to store torsional energy as the oscillating assembly 104 reaches the extreme of its motion, and thereafter biases the oscillating assembly back in the opposite direction.

Various types of materials, ranging from unvulcanized gum elastomers to rigid plastics, may form the test sample 100. It will be readily apparent that the rate of decay of the oscillation amplitude of assembly 104 is a function of the dynamic mechanical characteristics of the material under test. Thus information as to the rate of amplitude decay, supplied by the optical system 99, can be employed to determine these characteristics, for example shear-storage modulus, loss modulus, absolute shear modulus and energy dissipation factor. Moreover, if the tests are conducted over a range of temperatures, one can determine various phase transition points, such as glass temperature, melting temperature, or other transition temperatures that may be of interest.

As so far described, the mechanism is entirely conventional. Thus we turn now to a discussion of the detailed construction of the torsion pendulum device in order to understand those features of its construction which enable it to obtain more accurate results than prior art devices.

The supporting structure 108 includes an upright post 120 the lower end of which is vertically received within a socket 122 mounted upon a base plate 124 which lends stability to the entire structure. A threaded nut 126 is secured to the base plate, and receives a leveling screw 128.

In order to secure the anchoring assembly 102, an arm 130 embraces the supporting post 120 and is secured thereto at the desired height by a set screw 132. The arm 130 extends horizontally outward from the supporting post, and the outer end thereof is formed with an opening 134. The opening receives a cage structure 136, which is secured to the arm 130 by another set screw 138. The cage structure 136 extends downwardly from the arm 130, and at its lower end it threadedly receives a plug 140 to which an anchoring element 105 is secured by means of a bolt 142. The anchoring element is formed with a socket to receive the lower end of the sample 100, which is clamped therein by a set screw 107 acting against a bearing plate 109 which fits into the socket of the anchoring element 105 alongside the sample. Vertical bars 144 support the plug 140 and are spaced apart to define an open cage which surrounds the sample 100 to protect it from inadvertent contact, yet is open to facilitate loading and unloading of the sample, and to permit heating or cooling equipment (an oven, for example, or a Dewar flask) to maintain the sample at a controlled temperature for transition point experiments.

Above the level of the plug 140 the interior of the cage structure 136 is hollow, to accept the sample 100 and an upper securing element 103. The securing element is similar in construction to the anchoring element 105 described above, in that it has a socket to receive the upper end of the sample, and employs a set screw 111 and bearing plate 113 to clamp the sample therein. The upper end of the cage structure 136 also is hollow, to allow for free passage of a plastic connecting link 146 which is threaded to the upper end of element 103. The purpose of interposing the plastic link 146 above the sample 100 and element 103 is to limit heat conduction to or from the sample during tests which depend upon accurate temperature control. The elements 103 and 146 form part of the oscillating assembly 104, the angular motion of which torsionally stresses the sample 100 against the anchoring element 102.

The next element above the link 146 in the oscillating assembly 104 is a metal pendulum rod 148, the lower end of which is threaded to the link 146, and the upper end of which is secured to the flexible line 106 by means of a set screw 150. Various elements are mounted upon the metal rod 148, and form a part of the oscillating assembly 104, including a moment of inertia assembly comprising a pair of horizontal arms 152 with weights 154 which are adjustable along the length of the arms by means of set screws 156. The arms 152 are threaded to a collar 158 which in turn is secured to the rod 148 by means of a set screw 160. The moment of inertia of the oscillating assembly 104 can be adjusted by positioning the weights 104 upon the arms 152 in accordance with the requirements of different types of sample materials.

The optical system 99 comprises an optical element in the form of a glass disc 170 which surrounds the metal rod 148 and is secured thereto for angular oscillation therewith by collars 172 situated above and below the disc and held by set screws 174. The disc 170 is interposed between a light source 176 below it and a photoresponsive device 178 above it, which are both suitably mounted upon an arm 180 surrounding the supporting post 120 and clamped thereto by a set screw 182.

As best seen in FIG. 2, the glass disc 170 includes a central area 190 and an outer ring area 192, between which is an annular wedge area 194 the vertical thickness of which varies angularly about the disc 170. The disc 170 is positioned so that the light source 176 must pass through the wedge area 194 to reach the photoresponsive device 178, and the material of the glass disc 170 is uniformly doped with pigment material which reduces its transparency, so that the thicker portions of the wedge area 194 are relatively opaque, while the thinner portions are relatively transparent. As a result, the light signal reaching the photoresponsive device 178 varies sinusoidally as the assembly 104 (including optical disc 170) oscillates angularly. A corresponding electrical signal is developed by the photoresponsive device 178, and delivered over a cable 196 to a conventional $x$–$y$ recorder device which plots the waveform of oscillation amplitude versus time. This waveform reveals the decay of oscillations over time, which in turn reveals the dynamic mechanical characteristics of the material of the sample 100. Moreover, changes in these characteristics which take place over temperature yield information about transition temperatures for the sample material.

Note that this information concerning the amplitude of oscillation is obtained without mechanical contact with the oscillating assembly, or electrostatic or inductive interaction therewith. Thus no damping force is exerted to slow the oscillation of the pendulum and reduce the accuracy of the experimental results. Nor does the apparatus employ any oscillating mirrors to sweep a beam of light over a wide arc, which would require numerous photocells spaced apart and extended over a wide range to detect the limits of beam motion, and would not achieve the continuous and accurate results attainable with the present device.

The pulley 110 is supporttd upon an arm 200 which surrounds the supporting post 120 and is secured thereto by a set screw 202. The pulley is rotatable upon a shaft 204 so that the downward force exerted by the counterbalancing weight 112 upon the line 106 is able to counteract the weight of the assembly 104 suspended therefrom.

The mass of the weight 112 is selected so that the weight of the oscillating assembly 104 is precisely counterbalanced, with the result that the securing element 103 exerts neither an upward tensile force nor a downward compressive force upon the sample 100 under test. Since the application of any vertical force to the sample, tensile or compressive, changes its dynamic characteristics and thus produces inaccuracies, the selection of a precisely neutral vertical force condition substantially improves the quality of the test results obtained with the device of this invention.

A pair of air bearings 210 prevent the rod 148 from swaying horizontally and thus disturbing the free torsional oscillation which is essential to high accuracy. The bearings 210 are secured by set screws 211 at the end of air conduit tubes 212, which in turn are mounted upon collars 214 surrounding the supporting post 120 and secured thereto by set screws 216.

As best seen in FIG. 3, each air bearing 210 comprises a substantially cylindrical member 220 which is formed with a cylindrical interior chamber 222 surrounding but not touching the rod 148, and a horizontally projecting hollow boss 223 by means of which member 220 receives, and is secured to, the outer end of its associated air conduit tube 212. Each tube 212 is formed with a hollow interior 224 and the boss 223 is formed with a passageway 225 aligned therewith for the purpose of delivering air under pressure to the chamber 222. As seen in FIG. 1, at the other end of the air conduit tubes 212 each mounting collar 214 is provided with an internal air conduit 226 through which the air is delivered to the associated tube 212. A pair of sleeves 228 loosely surround the metal rod 148 and are inserted within the chambers 222 of respective bearings 210. Each sleeve 228 has an outside diameter much smaller than the inside diameter of its chamber 222, but is formed with flanges 230 and 231 at its upper and lower ends which fit tightly within a recess 227 and the interior of the chamber 222 respectively. Relief holes 229 are drilled radially through the sleeves 228, so that the air which is forced under pressure into the chamber 222 can only escape through the holes 229 into the narrow annular space between the rod 148 and the interior of sleeves 228. This keeps the pressure inside the chamber high, and causes a uniform flow of air to be directed radially inward against the pendulum rod 148 to keep it from swaying horizontally in any direction. It will be appreciated that this is accomplished without making any solid contact with the rod 148 or the remainder of the oscillating assembly 104, so that no significant damping force is applied to affect the angular motion thereof.

Just below the lowermost air bearing 210 a protective collar 240 is secured to the rod 148 to deflect the air which escapes downwardly from the bearing, and prevent it from impinging upon the sample 100 and its surrounding structure. This precaution makes it easier to control the temperature of the sample when a transition point experiment is in progress.

It will now be readily appreciated that the present torsion pendulum gives superior results by stabilizing the pendulum against horizontal sway without thereby incurring the penalty of damping contact therewith, by accurately and continuously sensing the amplitude of its angular motion, again without extracting energy therefrom, and by neutralizing all vertical forces upon the sample under test.

While there has been described what is at present considered to be the preferred embodiment of this invention, it will be obvious to those skilled in the art that various changes and modifications may be made therein without departing from the invention, and it is, therefore, intended to cover all such changes and modifications as fall within the true spirit and scope of the invention.

The embodiments of the invention in which an exclusive property or privilege is claimed are defined as follows:

1. A torsion pendulum for materials testing purposes, comprising:
   supporting means;
   a pulley mounted upon said supporting means;
   a flexible line extending over said pulley;
   an assembly suspended from one end of said flexible line for angular oscillation about a vertical axis;
   said oscillating assembly including means for connecting one end of a material sample under test to said oscillation assembly and an optical element affixed thereto for angular oscillation therewith, said element being graded angularly about said axis from relatively transparent to relatively opaque;
   means for sensing the amplitude of oscillation of said optical element, including a light source positioned to shine through said graded optical element and a photo-responsive device positioned to detect the intensity of illumination from said light source passing through said graded element, said sensing means being out of contact with said oscillating assembly;
   a pair of fluid bearings arranged to stabilize said oscillating assembly by fluid contact only therewith;
   means for delivering fluid to said bearings;
   means for securing the other end of said sample whereby angular oscillation of said assembly about said vertical axis is torsionally restored by said sample;
   and a counterweight suspended from the other end of said flexible line, said counterweight having a mass selected so that substantially zero vertical force is exerted upon said sample by said oscillating assembly.

2. Apparatus as in claim 1 further comprising:
   a protective cage for said specimen affixed to said lower end securing means and arranged to surround but not touch said specimen.

3. A torsion pendulum for materials testing purposes, comprising:
   supporting means;
   an oscillating assembly;
   means mounting said oscillating assembly on said supporting means for angular oscillation about a vertical axis;
   said oscillating assembly including means for connecting one end of a material sample under test to said oscillating assembly and optical element affixed thereto for angular oscillation therewith, said element being graded angularly about said axis from relatively transparent to relatively opaque;
   means for sensing the amplitude of oscillation of said optical element, including a light source positioned to shine through said optical element and a photo-responsive device positioned to detect the intensity of illumination from said light source passing through said optical element, said sensing means being out of contact with said oscillating assembly;
   means for securing the other end of said sample whereby angular oscillation of said assembly about said vertical axis is torsionally restored by said sample;
   a pair of fluid bearings arranged to stabilize said torsion rod by fluid contact only therewith;
   and means for mounting said bearings on said supporting means and for delivering fluid to said bearings.

4. Apparatus as in claim 3 further comprising:
   a protective cage for said specimen affixed to said lower end securing means and arranged to surround but not touch said specimen.

5. A torsion pendulum for materials testing purposes, comprising:
   supporting means;
   an oscillating assembly;
   means mounting said oscillating assembly on said supporting means for angular oscillation about a vertical axis;
   said oscillating assembly comprising means for connection to one end of a material sample under test;
   means mounted upon said supporting means for securing the other end of said sample whereby angular oscillation of said assembly about said vertical axis is torsionally restored by said sample;
   said oscillating assembly comprising an optical element affixed thereto for angular oscillation therewith, said element being graded angularly about said axis from relatively transparent to relatively opaque;
   and means upon said supporting means for sensing the amplitude of oscillation of said optical element, including a light source positioned to shine through said graded optical element and a photoresponsive device positioned to detect the intensity of illumination from said light source passing through said graded optical element, said sensing means being out of contact with said oscillating assembly.

6. Apparatus as in claim 5, further comprising:
   a protective cage for said specimen affixed to said lower end securing means and arranged to surround but not touch said specimen.

7 A torsion pendulum for materials testing purposes, comprising:
   an oscillating assembly for angular oscillation about a vertical axis;
   said oscillating assembly including means for connecting one end of a material sample under test to said oscillating assembly and an optical element affixed thereto for angular oscillation therewith, said element being graded angularly about said axis from relatively transparent to relatively opaque;

means for securing the other end of said sample whereby angular oscillation of said assembly about said vertical axis is torsionally restored by said sample;

and means for sensing the amplitude of oscillation of said optical element, including a light source positioned to shine through said graded optical element and a photoresponsive device positioned to detect the intensity of illumination from said light source passing through said graded optical element, said sensing means being out of contact with said oscillating assembly.

References Cited
UNITED STATES PATENTS

| | | | |
|---|---|---|---|
| 3,116,628 | 1/1964 | Gordon | 73—9 |
| 3,313,148 | 4/1967 | Dautreppe et al. | 73—99 |

JERRY W. MYRACLE, Primary Examiner

U.S. Cl. X.R.

73—15.6